(12) United States Patent
Yagi et al.

(10) Patent No.: US 7,072,272 B2
(45) Date of Patent: Jul. 4, 2006

(54) DIFFRACTION TYPE OPTICAL PICKUP LENS AND OPTICAL PICKUP APPARATUS USING THE SAME

(75) Inventors: Kaneyoshi Yagi, Saitama (JP); Masato Kawabata, Saitama (JP); Toshiaki Katsuma, Saitama (JP)

(73) Assignee: Fujinon Corporation, Saitama (JP)

( * ) Notice: Subject to any disclaimer, the term of this patent is extended or adjusted under 35 U.S.C. 154(b) by 667 days.

(21) Appl. No.: 10/075,345

(22) Filed: Feb. 15, 2002

(65) Prior Publication Data

US 2002/0131175 A1 Sep. 19, 2002

(30) Foreign Application Priority Data

Mar. 14, 2001 (JP) ........................................ 2001-073040

(51) Int. Cl.
*G11B 7/00* (2006.01)

(52) U.S. Cl. ............................. 369/112.23; 369/112.08; 369/44.23

(58) Field of Classification Search ............. 369/44.11, 369/44.12, 44.14, 44.23, 44.27, 44.37, 112.01, 369/112.03, 112.08, 112.1, 112.13, 112.15, 369/112.2, 112.23, 112.24, 112.26, 103

See application file for complete search history.

(56) References Cited

U.S. PATENT DOCUMENTS 6,088,322 A * 7/2000 Broome et al. ........ 369/112.26
6,429,972 B1 * 8/2002 Ota et al. .................... 359/569

FOREIGN PATENT DOCUMENTS

| JP | 2000-081566 | 3/2000 |
| JP | 2001-272516 | 10/2001 |
| JP | 2001-272517 | 10/2001 |

* cited by examiner

*Primary Examiner*—Muhammad Edun
(74) *Attorney, Agent, or Firm*—Snider & Associates; Ronald R. Snider

(57) ABSTRACT

In a diffraction type optical pickup lens, at least one surface of a convergent lens is formed with such an aspheric surface that a luminous flux having a wavelength $\lambda_1$ is converged at a first predetermined position. At least one surface of the convergent lens is formed with a zone plate having such a wavelength selectivity that a luminous flux having a wavelength $\lambda_2$ is converged at a second predetermined position whereas the luminous flux having a wavelength $\lambda_1$ is transmitted therethrough as it is. The convergent lens is transparent to the luminous fluxes having the wavelengths $\lambda_1$ and $\lambda_2$.

10 Claims, 6 Drawing Sheets

ENLARGED VIEW OF PART A

ENLARGED VIEW OF PART A

INCIDENT LIGHT (λ2)

INCIDENT LIGHT (λ1)

ENLARGED VIEW OF PART B

ENLARGED VIEW OF PART C

ENLARGED VIEW OF PART D

DIFFRACTION TYPE OPTICAL PICKUP LENS AND OPTICAL PICKUP APPARATUS USING THE SAME

RELATED APPLICATIONS

This application claims the priority of Japanese Patent Application No. 2001-73040 filed on Mar. 14, 2001, which is incorporated herein by reference.

BACKGROUND OF THE INVENTION

1. Field of the Invention

The present invention relates to a diffraction type optical pickup lens and an optical pickup apparatus using the same. In an optical pickup apparatus commonly usable for two or more kinds of optical recording media, in which light beams having respective wavelengths different from each other are employed as irradiation light for the optical recording media depending on the kinds of optical recording media, the diffraction type optical pickup lens can favorably focus these light beams onto their corresponding recording media.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using a single optical pickup apparatus has been known.

In such two kinds of optical recording media, for example, visible light at about 650 nm is used for DVD in order to improve the recording density, whereas near-infrared light at about 780 nm is required to be used for CD-R since it has no sensitivity for light in the visible region. An optical pickup apparatus which can be used in common for both of them is based on a dual-wavelength beam type which uses two light beams having wavelengths different from each other as irradiation light.

In the case where the disc thickness or numerical aperture differs between the above-mentioned two kinds of optical recording media, however, it is necessary for such an optical pickup apparatus to have different focusing actions for the respective wavelengths of light for carrying out reproducing or recording.

For responding to such a requirement, a system in which two objective lenses having respective focusing actions different from each other are made exchangeable depending on optical recording media for carrying out reproducing or recording has been known. However, it complicates the structure of the optical pickup apparatus, while opposing demands for making it compact and lowering its cost.

As an apparatus satisfying such a requirement, one in which one surface of a convergent lens having aspheric surfaces on both sides is provided with a zonal diffraction grating centered at the optical axis (Japanese Unexamined Patent Publication No. 2000-81566). Since diffracted light on the same order is utilized as effective recording/reproducing light with respect to two wavelengths of light, this diffraction type lens does not function as a diffraction grating having a wavelength selectivity. Therefore, in the diffraction type lens disclosed in this publication, the degree of freedom in setting the focusing position may greatly decrease, so that there may be cases where two luminous fluxes having respective wavelengths different from each other are hard to converge at positions different from each other in practice.

On the other hand, a diffraction type lens in which two zone plates having a wavelength selectivity acting on only their corresponding wavelengths of light are formed on respective sides of a flat glass sheet on the light source side of an object lens has already been proposed in commonly-assigned applications Japanese Unexamined Patent Publication Nos. 2001-272516 and 2001-272517).

The commonly-assigned technique mentioned above is quite excellent in that two wavelengths of light can easily be focused onto optical recording media having respective NA and thickness values different from each other by using zone plates having a wavelength selectivity.

Since the flat sheet itself has no refracting power, however, it is necessary that a diffraction grating acting to converge a parallel luminous flux incident on the flat sheet bear all the focusing functions and aberration-correcting functions. Therefore, even when a certain degree of interval can be taken as a grating pitch in the vicinity of optical axis, the grating pitch may become smaller in the vicinity of marginal areas, whereby it is not so easy to process gratings, such as stepped gratings in particular. Though this may not be a very big problem if the technique for processing fine gratings improves as a matter of course, there is an urgent demand for finding measures against this problem at least at this point of time in view of the time and cost required for processing diffraction gratings.

SUMMARY OF THE INVENTION

In view of the circumstances mentioned above, it is an object of the present invention to provide a diffraction type optical pickup lens which can focus two wavelengths of light onto respective recording surfaces of optical recording media having disc thicknesses different from each other, and an optical pickup apparatus using the same. In particular, the diffraction type optical pickup lens can favorably correct aberrations while enabling a diffraction grating to have a grating pitch with such a magnitude that it can easily be processed in marginal parts of the lens distanced from the optical axis without complicating the structure of the optical pickup apparatus.

The diffraction type optical pickup lens in accordance with the present invention comprises a convergent lens having at least one surface formed with such an aspheric surface that a luminous flux having a wavelength $\lambda_1$ is converged at a first predetermined position;

wherein at least one surface of the convergent lens is formed with a zone plate having such a wavelength selectivity that a luminous flux having a wavelength $\lambda_2$ is converged at a second predetermined position whereas the luminous flux having the wavelength $\lambda_1$ is transmitted therethrough as it is; and wherein the convergent lens is transparent to the luminous fluxes having the wavelengths $\lambda_1$ and $\lambda_2$.

Preferably, the zone plate is constituted by a concentric grating having a stepped cross section.

Preferably, the number of steps in the stepped concentric grating is 3.

Preferably, each of both surfaces of the convergent lens is formed with such a zone plate that the luminous flux having the wavelength $\lambda_2$ is converged at the second predetermined position.

Preferably, each of both surfaces of the convergent lens is formed with such an aspheric surface that the luminous flux having the wavelength $\lambda_1$ is converged at the first predetermined position.

Preferably, the zone plate is formed by depositing titanium dioxide into a predetermined form on a lens substrate.

The optical pickup apparatus in accordance with the present invention comprises the grating type optical pickup lens of the present invention and is adapted to record or reproduce two kinds of optical recording media having respective thicknesses different from each other; wherein one of the optical recording media is recorded or reproduced by the luminous flux having the wavelength $\lambda$hd 2, whereas the other is recorded or reproduced by the luminous flux having the wavelength $\lambda_1$.

Preferably, a luminous flux incident on the diffraction type optical pickup lens is a substantially parallel luminous flux.

Preferably, NA with respect to the luminous flux for the one optical recording medium is set smaller than that with respect to the luminous flux for the other recording medium, whereas the zone plate is formed on the surface of the convergent lens on the light source side.

The one optical recording medium is CD-R, for example, whereas the other optical recording medium is DVD, for example.

In the optical pickup lens in accordance with the present invention, a zone plate having a wavelength selectivity is formed on at least one surface of a convergent lens, whereas at least one surface of the convergent lens is formed aspheric.

When at least one surface of a convergent lens is formed with such an aspheric surface that a luminous flux having a wavelength $\lambda_1$ is converged at a first predetermined position, the luminous flux having the wavelength $\lambda_1$ can be focused onto the recording surface of a first optical recording medium while making aberrations favorable. On the other hand, the state of focusing of a luminous flux having a wavelength $\lambda_2$ on the recording surface of a second optical recording medium having a thickness different from that of the first optical recording medium may not be so favorable due to differences in the thickness and wavelength, whereby aberrations may increase. Therefore, a zone plate formed on at least one surface of the convergent lens so as to act only on a luminous flux having a wavelength $\lambda_2$ is used for focusing the luminous flux having the wavelength $\lambda_2$ onto the recording surface of a second optical recording medium while in a state yielding small aberrations.

While the convergent lens has such a form as to bear a refracting power, an aspheric form is used in order to favorably converge the luminous flux having the wavelength $\lambda_1$ for recording/reproducing the first optical recording medium, and a zone plate is used in order to favorably converge the luminous flux having the wavelength $\lambda_2$ for recording/reproducing the second optical recording medium as such, whereby a certain magnitude of pitch for the diffraction grating constituting the zone plate can also be secured in marginal areas.

DESCRIPTION OF THE PREFERRED EMBODIMENTS

In the following, embodiments of the present invention will be explained with reference to the drawings.

Figure 2:
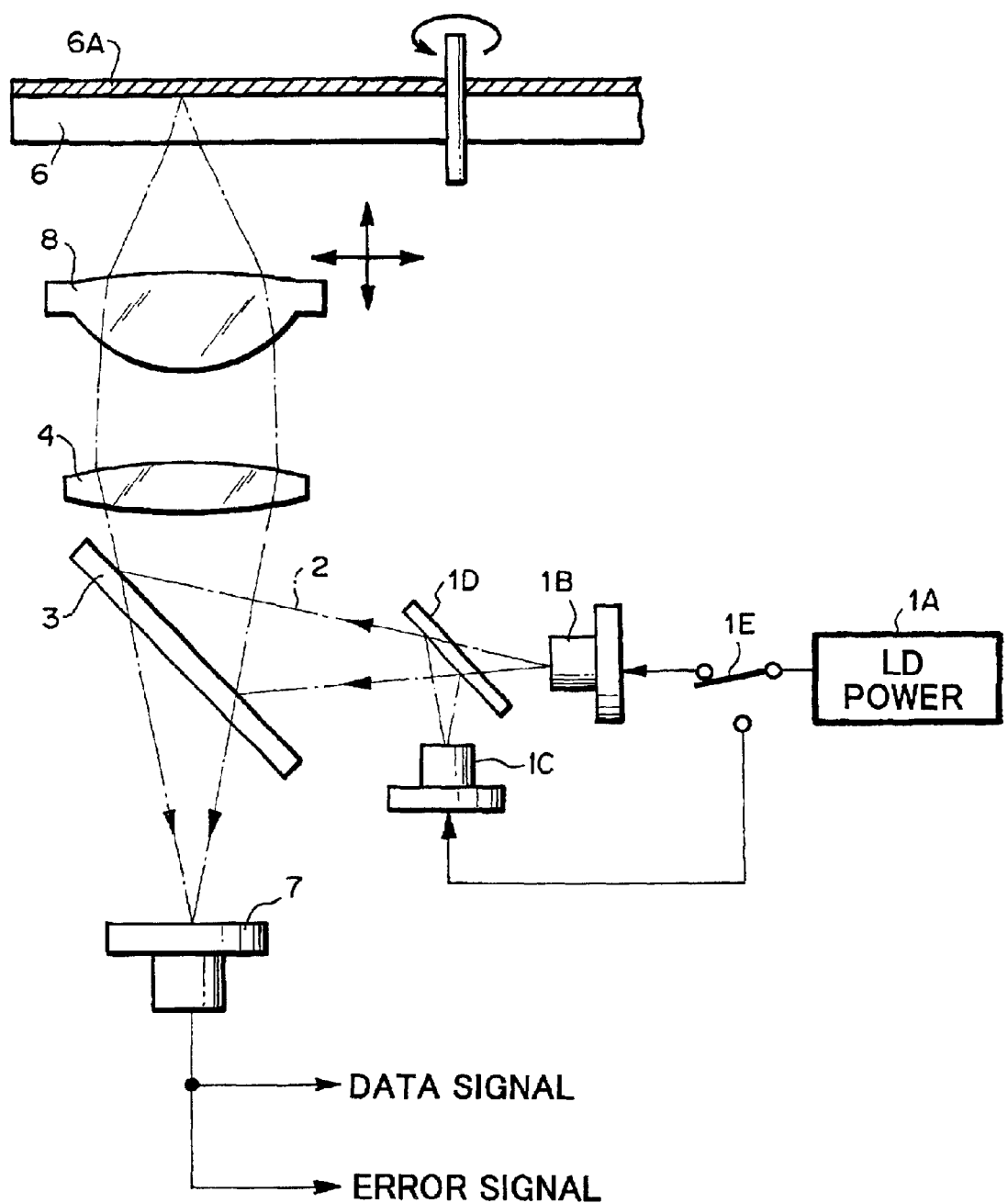
FIG. 2 is a schematic view showing an optical pickup apparatus using a diffraction type optical pickup lens in accordance with an embodiment of the present invention.

First, an optical pickup apparatus using the diffraction type optical pickup lens in accordance with an embodiment of the present invention will be explained with reference to FIG. 2.

In this optical pickup apparatus, a semiconductor laser 1B, 1C outputs a laser beam 2 when power is supplied thereto from an LD power source 1A, a half mirror 3 reflects the laser beam 2, a collimator lens 4 turns thus reflected laser beam 2 into substantially parallel light, and a diffraction type optical pickup lens 8 functioning as an objective lens converts the parallel light into convergent light, with which a recording region 6A of an optical disc 6 is irradiated. The semiconductor laser 1B is a light source for outputting a laser beam in a near-infrared region having a wavelength of about 780 nm for CD-R (recordable optical disc), whereas the semiconductor laser 1C is a light source for outputting a laser beam, for example, in a visible region having a wavelength of 650 nm for DVD (digital versatile disc). The laser beam 2 outputted from one of the semiconductor lasers 1B, 1C irradiates the half mirror 3 by way of a half mirror 1D. A changeover switch 1E is disposed between the LD power source 1A and the semiconductor lasers 1B, 1C. As the changeover switch 1E is operated, power is supplied to one of the semiconductor lasers 1B, 1C.

In the recording region 6A, pits carrying signal information are arranged in a track. The reflected light of laser beam 2 from the recording region 6A is made incident on the half mirror 3 by way of the diffraction type optical pickup lens 8 and collimator lens 4 while carrying the signal information, and is transmitted through the half mirror 3, so as to be made incident on a four-part photodiode 7. Since the respective quantities of light received at the four separate diode positions are obtained in the form of electric signals in the photodiode 7, a predetermined arithmetic operation is carried out according to the quantities of received light in an arithmetic means which is not depicted, whereby data signals and respective error signals for focusing and tracking are obtained.

Since the half mirror 3 is inserted in the optical path of the return light from the optical disc 6 in a state tilted by 45°, it acts like a cylindrical lens, so that the light beam transmitted through the half mirror 3 has an astigmatism, whereby the amount of focusing error is determined according to the form of the beam spot of return light on the four-part photodiode 7. Here, the collimator lens 4 can be omitted depending on the circumstances. Also, a grating may be inserted between the semiconductor lasers 1B, 1C and the half mirror 3, such that tracking errors can be detected by use of three beams.

Thus, the optical pickup apparatus in accordance with this embodiment is configured such that signals can be recorded and reproduced for any optical disc 6 of CD-R and DVD.

Here, each of the CD-R and DVD has a protective sheet made of PC (polycarbonate, whose refractive index $n_D$=1.514).

Meanwhile, the geometric thickness of CD-R is standardized at 1.2 mm, whereas the geometric thickness of DVD is substantially standardized at 0.6 mm. In order to securely carry out focusing with respect to each of the optical discs 6, it is necessary to provide a configuration having focusing actions different from each other with respect to the respective wavelengths of light for carrying out recording/reproducing.

Also, the CD-R and DVD differ from each other in NA of recording/reproducing light. Namely, the NA for the former is 0.45, whereas that for the latter is 0.60. Therefore, influences of spherical aberration must be taken into consideration with respect to the recording/reproducing light for the DVD having a greater NA.

Figure 1A:
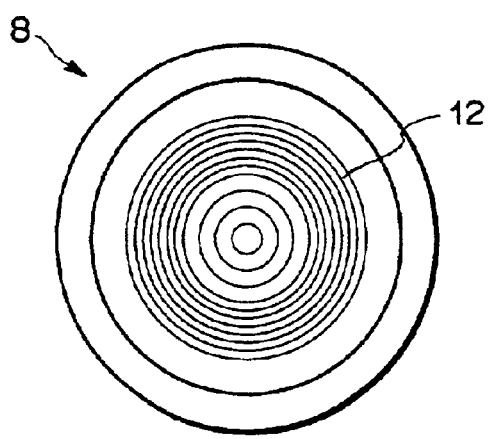
FIGS. 1A, 1B, and 1C are front, side, and enlarged sectional views showing the diffraction type optical pickup lens in accordance with an embodiment of the present invention.
Figure 1B:
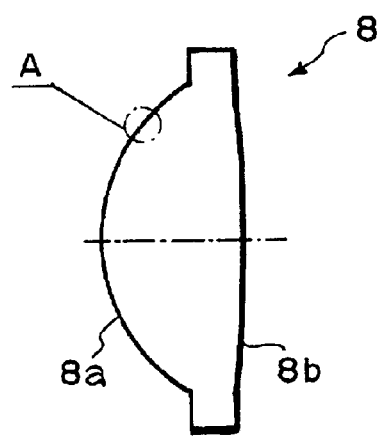
Figure 1C:
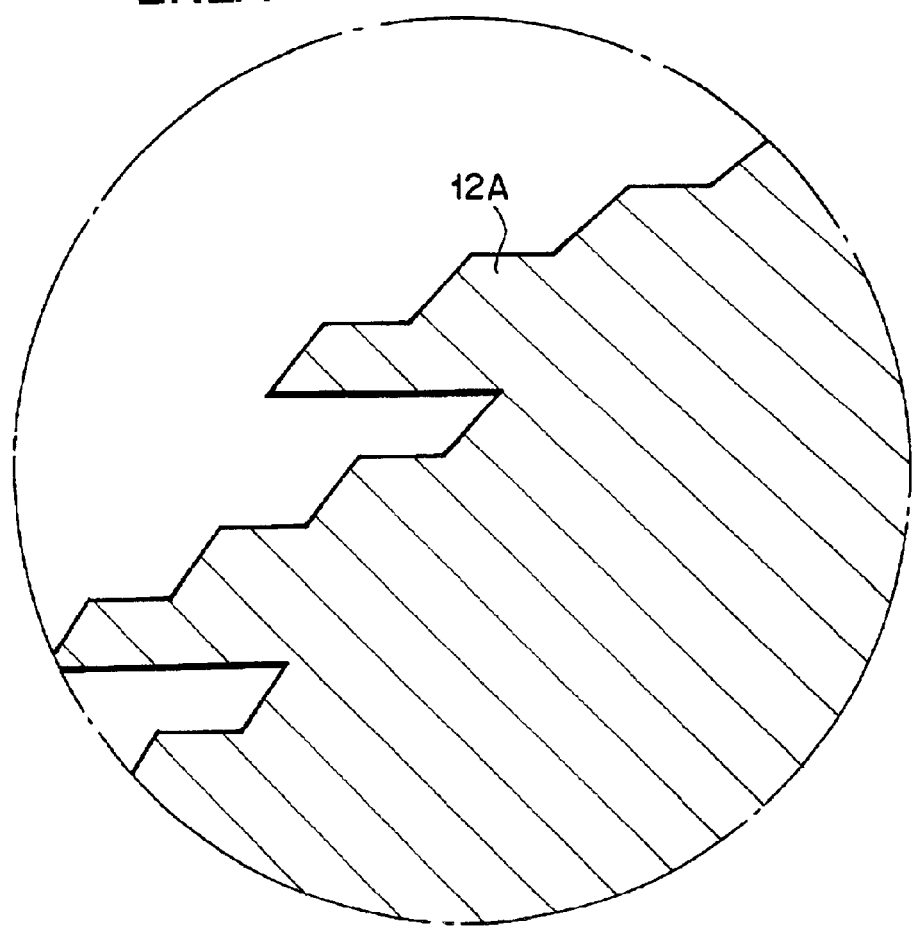
Figure 3A:
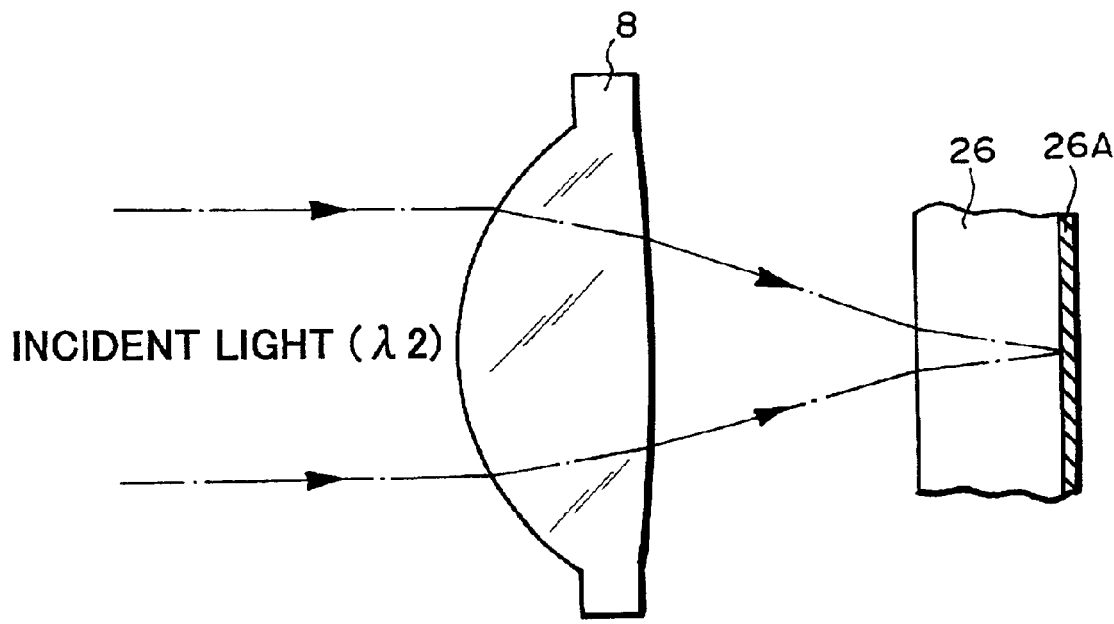
FIGS. 3A and 3B are views showing operations of the diffraction type optical pickup lens shown in FIGS. 1A to 1C.

Hence, as in the diffraction type optical pickup lens 8 shown in FIGS. 1A to 1C, both surfaces 8a, 8b of the diffraction type optical pickup lens 8 are made aspheric while the surface 8a on the light source side is provided with a zone plate 12 having a wavelength selectivity, so that both CD-R and DVD are favorably recorded/reproduced in the above-mentioned optical pickup apparatus. As a consequence, when a CD-R 26 is disposed at a predetermined position (on a turntable) for its recording/reproducing as shown in FIG. 3A, the laser beam 2 having a wavelength of 780 nm ($\lambda_2$) from the semiconductor laser 1B is made incident on the diffraction type optical pickup lens 8 while in a substantially parallel state, whereby the incident laser beam 2 is focused by the diffraction type optical pickup lens 8 onto a recording surface 26A of the CD-R 26, while aberrations are corrected by the zone plate 12 formed on the surface (hereinafter referred to as first surface) 8a of the diffraction type optical pickup lens 8 on the light source side.

Figure 3B:
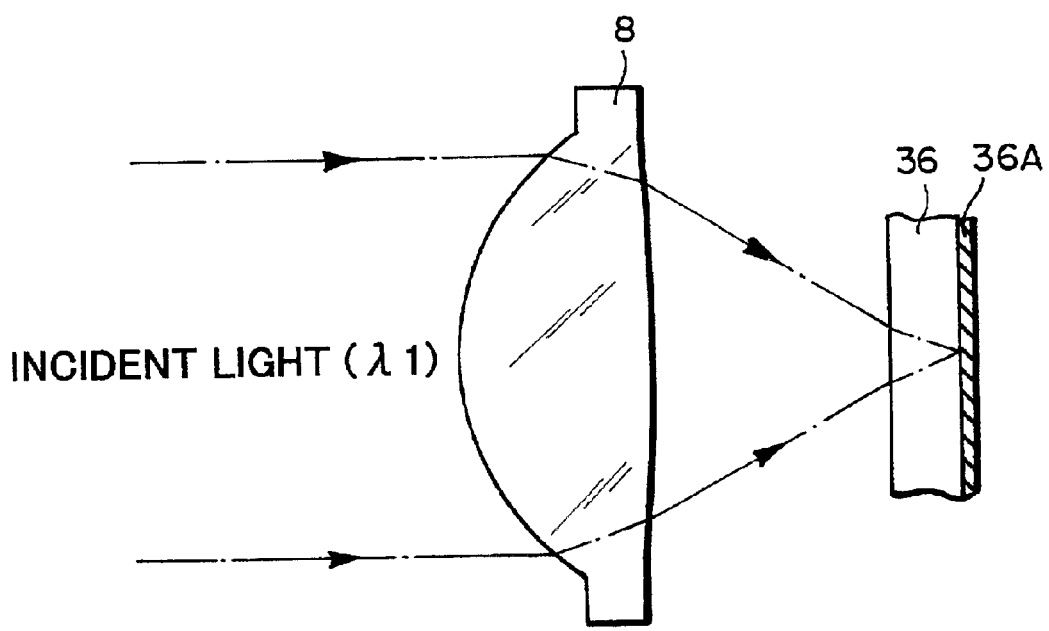

When a DVD 36 is disposed at a predetermined position (on the turntable) for its recording/reproducing as shown in FIG. 3B, the laser beam 2 having a wavelength of 650 nm ($\lambda_1$) from the semiconductor laser 1C is made incident on the diffraction type optical pickup lens 8 while in a substantially parallel state, whereby the incident laser beam 2 is favorably focused onto a recording surface 36A of the DVD 36 due to the convex form of the diffraction type optical pickup lens 8 and the aspheric forms formed on both surfaces 8a, 8b of the lens 8.

Since the zone plate 12 formed on the first surface 8a has no focusing action (thus yielding 100% of zero-order diffraction light) with respect to the laser light 2 having the wavelength of 650 nm ($\lambda_1$), this laser light 2 is refracted in conformity to the original form of the lens 8.

FIG. 1C shows the cross-sectional structure of the first surface 8a of the above-mentioned diffraction type optical pickup lens 8, illustrating the state where the first surface 8a of the convergent lens 8 made of glass is formed with a zone plate 12A having a distorted one-side stepped cross section (with a step height of h and a bottom face defining the original contour of the first surface 8a). Since the number of steps is 3 while each step has a height of h, the total height of steps becomes 3 h.

Figure 4A:
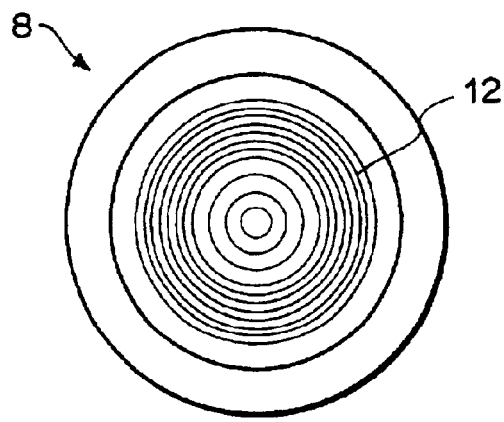
FIGS. 4A, 4B, and 4C are front, side, and enlarged sectional views showing the diffraction type optical pickup lens in accordance with an embodiment of the present invention.
Figure 4B:
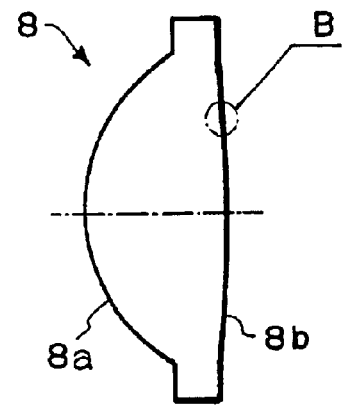
Figure 4C:
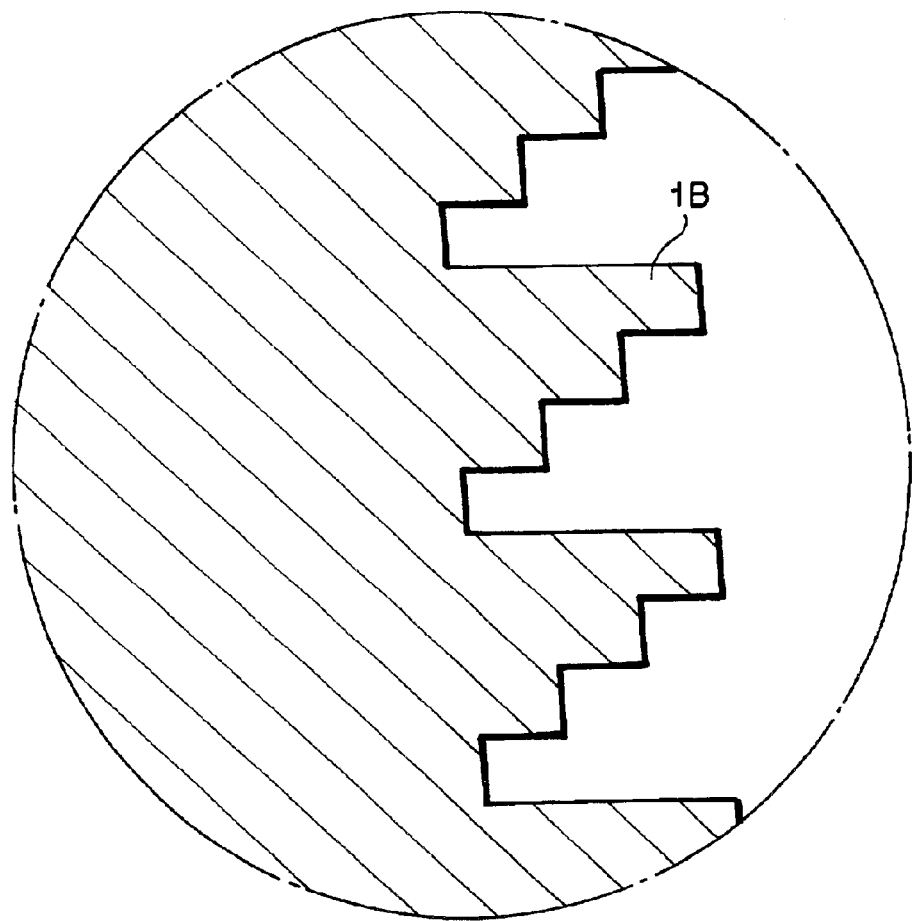

As shown in FIGS. 4A to 4C, the surface (hereinafter referred to as second surface) 8b on the optical recording medium side may also be formed with a zone plate 12B having a form substantially the same as the stepped form shown in FIGS. 1A to 1C. When both surfaces of the diffraction type optical pickup lens 8 are formed with the zone plates 12A, 12B as such, it becomes easier to correct aberrations.

Specific grating pitches of the zone plates 12A, 12B are determined in view of NA and the like of lenses required for DVD and CD-R.

The height h of each step is set to such a value that the ratio of first-order diffraction light with respect to the laser light 2 having the wavelength 780 nm ($\lambda_2$) for recording/reproducing CD-R is made greater, whereas the ratio of zero-order diffraction light with respect to the laser light having the wavelength 650 nm ($\lambda_1$) for recording/reproducing DVD becomes 100%.

When the cross section of each of the zone plates 12A, 12B is thus formed so as to have a stepped part on one side instead of a simple rectangular form, one of ±first-order diffraction light components can be outputted alone, whereby the unused diffraction light component can be prevented from causing useless noise.

The zone plates 12A, 12B are integrally formed with the lens substrate from glass.

Figure 5A:
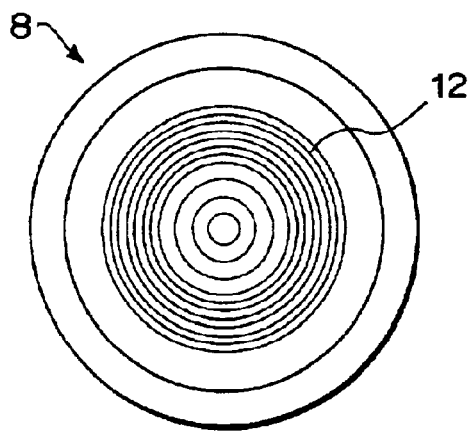
FIGS. 5A, 5B, and 5C are front, side, and enlarged sectional views showing the diffraction type optical pickup lens in accordance with an embodiment of the present invention.
Figure 5B:
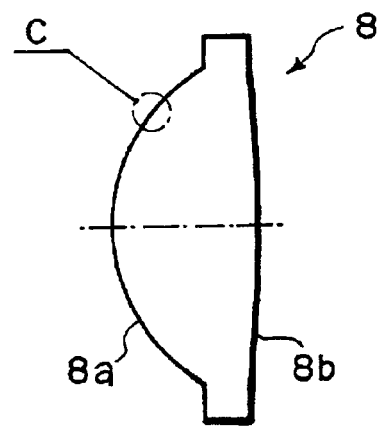
Figure 5C:
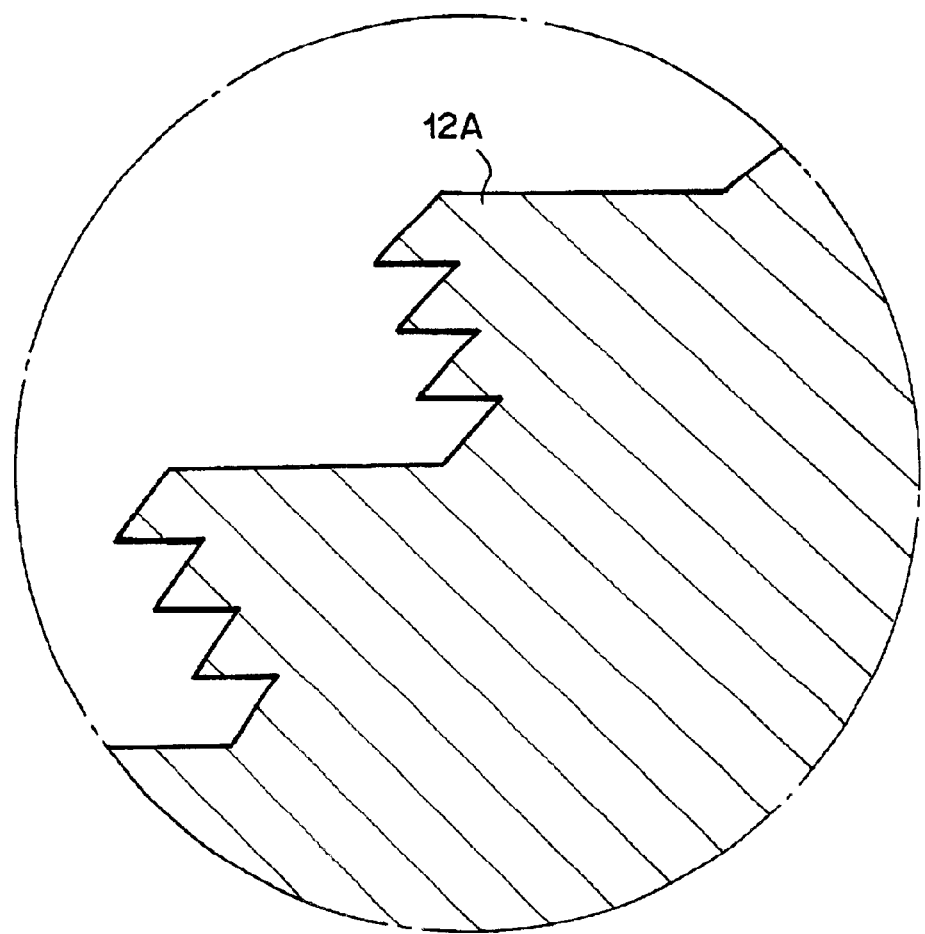
Figure 6A:
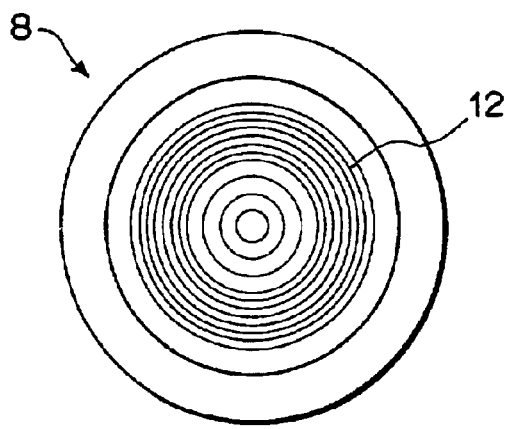
FIGS. 6A, 6B, and 6C are front, side, and enlarged sectional views showing the diffraction type optical pickup lens in accordance with an embodiment of the present invention.
Figure 6B:
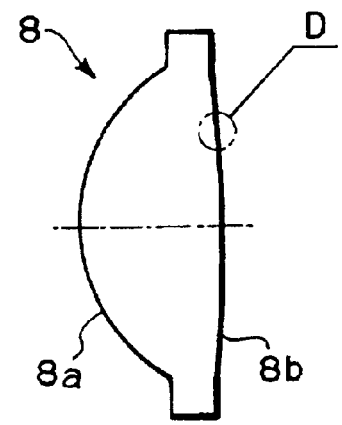
Figure 6C:
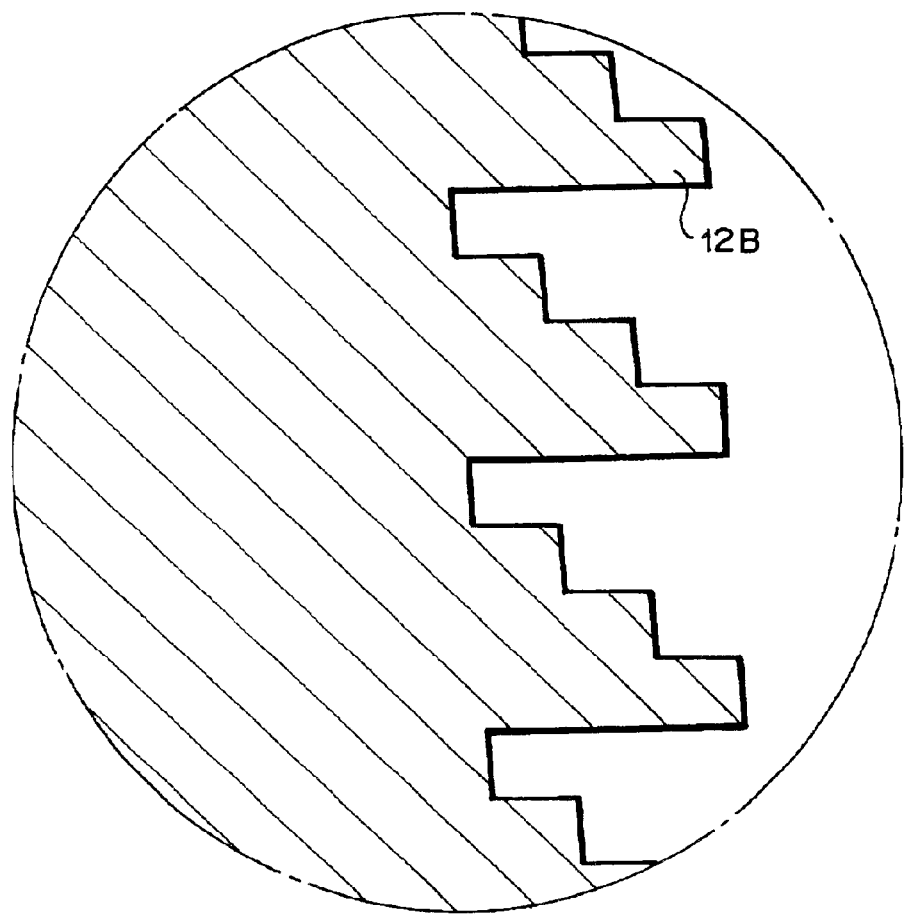

FIGS. 5A to 5C and FIGS. 6A to 6C show different embodiments of the diffraction type optical pickup lens 8. FIGS. 5A to 5C show a modified example of the cross-sectional structure of the zone plate 12A on the first surface 8a of the diffraction type optical pickup lens 8, in which the orientation of steps is opposite from that in the zone plate 12A shown in FIGS. 1A to 1C. On the other hand, FIGS. 6A to 6C show a modified example of the cross-sectional structure of the zone plate 12B on the second surface 8b of the diffraction type optical pickup lens 8, in which the orientation of steps is opposite from that in the zone plate 12B shown in FIGS. 4A to 4C.

One of the two zone plates 12A, 12B may be employed alone.

Further, a combination of the zone plate 12A shown in FIGS. 1A to 1C with the zone plate 12B shown in FIGS. 4A to 4C or FIGS. 6A to 6C, or a combination of the zone plate 12A shown in FIGS. 5A to 5C with the zone plate 12B shown in FIGS. 4A to 4C or FIGS. 6A to 6C may be employed.

The maximum outer diameters of the zone plates 12A, 12B may be set while taking account of respective beam diameters of two laser beams 2 having wavelengths different from each other incident thereon. Which maximum outer diameter is greater or smaller can appropriately be set in view of the NA of lens.

The diffraction type lens of the present invention can be integrally molded not only from glass as in the above-mentioned embodiments, but also from plastics. Further, while using glass or plastics as a lens substrate, a zone plate may be formed on the lens substrate by depositing titanium dioxide ($TiO_2$) or other various materials such as metals, metal oxides, and nonmetals, for example. It may be formed not only by depositing but also by sputtering, plating, roll-coating, and the like.

The diffraction grating of zone plates may also have various numbers of steps other than 3. For example, those having more than 3 steps or a rectangular cross section are also employable.

While each zone plate functions to correct aberrations with respect to a luminous flux having one of wavelengths, it may have a luminous flux refracting function in addition to the aberration correcting function, so as to bear a part of the refracting power caused by the surface form.

While both surfaces of the lens substrate are made aspheric in the above-mentioned embodiments, one surface may be made aspheric alone.

The optical recording media to be recorded/reproduced in the optical pickup apparatus of the present invention are not limited to DVD and CD-R. The present invention is applicable to cases where two kinds of optical recording media whose specs for wavelength regions in use differ from each other are recorded/reproduced by a common optical pickup apparatus.

In the diffraction type optical pickup lens and optical pickup apparatus of the present invention, as explained in the foregoing, at least one surface of a convergent lens is formed with such an aspheric surface that a luminous flux having a wavelength $\lambda_1$ is converged at a first predetermined position, whereby the luminous flux having the wavelength $\lambda_1$ can be focused onto the recording surface of a first optical recording medium while aberrations are made favorable. On the other hand, the state of focusing of a luminous flux having a wavelength $\lambda_2$ on the recording surface of a second optical recording medium having a thickness different from that of the first optical recording medium may not be so favorable depending on the original form of the convergent lens and actions of the aspheric surface. However, by a zone plate formed on at least one surface of the convergent lens so as to act on only the luminous flux having the wavelength $\lambda_2$, this luminous flux is focused onto the recording surface of the second optical recording medium while in a state yielding small aberrations.

Namely, while the refracting power is carried by the form of the convergent lens, an aspheric form is used for favorably converging the luminous flux having the wavelength $\lambda_1$ for recording/reproducing the first optical recording medium, and a zone plate is used for favorably converging the luminous flux having the wavelength $\lambda_2$ for recording/reproducing the second optical recording medium. This skillful technique enables a single optical pickup lens to favorably record/reproduce two kinds of optical recording media having respective thicknesses different from each other, while securing a certain magnitude of pitches in the diffraction grating constituting the zone plate even in its marginal areas.

What is claimed is:

1. A diffraction type optical pickup lens comprising a convergent lens having at least one surface formed with such an aspheric surface that a luminous flux having a wavelength $\lambda_1$ is converged at a first predetermined position;

wherein at least one surface of said convergent lens is formed with a zone plate having such a wavelength selectivity that a luminous flux having a wavelength $\lambda_2$ is converged at a second predetermined position whereas said luminous flux having said wavelength $\lambda_1$ is transmitted therethrough as it is; and wherein said convergent lens is transparent to said luminous fluxes having said wavelengths $\lambda_1$ and $\lambda_2$.

2. A diffraction type optical pickup lens according to claim 1, wherein said zone plate is constituted by a concentric grating having a stepped cross section.

3. A diffraction type optical pickup lens according to claim 2, wherein the number of steps in said stepped concentric grating is 3.

4. A diffraction type optical pickup lens according to claim 1, wherein each of both surfaces of said convergent lens is formed with such a zone plate that said luminous flux having said wavelength $\lambda_2$ is converged at said second predetermined position.

5. A diffraction type optical pickup lens according to claim 1, wherein each of both surfaces of said convergent lens is formed with such an aspheric surface that said luminous flux having said wavelength $\lambda_1$ is converged at said first predetermined position.

6. A diffraction type optical pickup lens according to claim 1, wherein said zone plate is formed by depositing titanium dioxide into a predetermined form on a lens substrate.

7. An optical pickup apparatus comprising the diffraction type optical pickup lens according to claim 1, said apparatus being adapted to record or reproduce two kinds of optical recording media having respective thicknesses different from each other;

wherein one of said optical recording media is recorded or reproduced by said luminous flux having said wavelength $\lambda_2$, whereas the other is recorded or reproduced by said luminous flux having said wavelength $\lambda_1$.

8. An optical pickup apparatus according to claim 7, wherein a luminous flux incident on said diffraction type optical pickup lens is a substantially parallel luminous flux.

9. An optical pickup apparatus according to claim 7, wherein NA with respect to said luminous flux for said one optical recording medium is set smaller than that with respect to said luminous flux for the other recording medium; and wherein said zone plate is formed on the surface of said convergent lens on a light source side.

10. An optical pickup apparatus according to claim 9, wherein said one optical recording medium is CD-R, whereas the other optical recording medium is DVD.

* * * * *